(12) United States Patent
Stanley

(10) Patent No.: US 7,000,126 B2
(45) Date of Patent: Feb. 14, 2006

(54) METHOD FOR MEDIA CONTENT PRESENTATION IN CONSIDERATION OF SYSTEM POWER

(75) Inventor: Randy P. Stanley, Aptos, CA (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 10/126,274

(22) Filed: Apr. 18, 2002

(65) Prior Publication Data
US 2003/0200481 A1    Oct. 23, 2003

(51) Int. Cl.
*G06F 1/32* (2006.01)
(52) U.S. Cl. ............... 713/320; 713/300; 713/323; 709/203
(58) Field of Classification Search ............ 713/300, 713/320, 323; 709/203
See application file for complete search history.

(56) References Cited

U.S. PATENT DOCUMENTS

| | | | |
|---|---|---|---|
| 5,916,310 A | * | 6/1999 | McCain ............ 710/67 |
| 5,949,484 A | * | 9/1999 | Nakaya et al. ......... 348/384.1 |
| 6,487,588 B1 | * | 11/2002 | Phillips et al. ............ 709/218 |
| 2002/0040442 A1 | | 4/2002 | Ishidera |
| 2002/0073235 A1 | * | 6/2002 | Chen et al. ............ 709/246 |
| 2003/0065497 A1 | * | 4/2003 | Rhoads .................... 703/18 |
| 2004/0125877 A1 | * | 7/2004 | Chang et al. ......... 375/240.28 |

FOREIGN PATENT DOCUMENTS

WO    WO01/57732 A1    8/2001

* cited by examiner

*Primary Examiner*—Thomas Lee
*Assistant Examiner*—Vincent Tran
(74) *Attorney, Agent, or Firm*—Blakely, Sokoloff, Taylor & Zafman LLP

(57) ABSTRACT

A method by which the presentation of superfluous media content requiring system activity is reduced or suspended in consideration of system power. For one embodiment, a user processing system indicates its power mode to a power mode/level determination applet embedded on a Web page. Action items within the web page respond to DC powered systems by limiting speed and/or the duration of animation for animated objects within the Web page. Additionally, or alternatively, the limitation or suspension of animation may be in response to power level. For one embodiment the superfluous media content is reduced or suspended after some period regardless of system power considerations.

30 Claims, 3 Drawing Sheets

METHOD FOR MEDIA CONTENT PRESENTATION IN CONSIDERATION OF SYSTEM POWER

FIELD OF THE INVENTION

The present invention relates generally to power management of mobile processing systems, and more specifically to a method for presenting animated content in consideration of system power.

BACKGROUND OF THE INVENTION

Mobile PC manufacturers compete to increase system performance while reducing or at least maintaining power consumption. Mobile PC performance has increased dramatically. However, because it is not desirable to have larger batteries, and battery efficiency has not kept pace with processor performance, battery life for systems operating at peak performance has been drastically reduced. Manufacturers introduced the capability of power and performance control to prolong battery life. Such power management systems (PMS), which may be an embedded part of the operating system (OS), allow the mobile processing system the option of a variety of power states. When the system is idle it moves to a very efficient power state. The CPU, not being required, goes to a low performance (low-voltage/low-frequency) mode. For example, a user may access media content via Internet related networks (e.g., the World Wide Web (Web)). Such content may be in the form of a web page containing a new article or series of articles. As the user reads the articles, there is very little CPU activity other than occasionally changing pages.

There is a great deal of media content containing superfluous presentations such as animated objects. For example, a web page may contain moving (e.g spinning) objects such as phone numbers or icons for advertisement purposes or solely for aesthetic purposes. Animating theses objects requires the CPU to assume a higher performance mode, rotate the object, and then resume a low power mode. Typically, today a user accessing Web pages via the Internet, even on a mobile processing system, is accessing an AC power source because the Internet connectivity is via wire and is usually proximate to an AC power source. However, as wireless Internet connectivity becomes more prevalent, users may not wish to access web content that contains power draining animation. Additionally, in many instances the animation attains its attention-getting effect after a few seconds and subsequently becomes a source of annoyance for the user. This defeats the purpose of an advertiser hoping to entice a user with animated objects.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

An embodiment of the present invention provides a method by which the presentation of superfluous media content requiring system activity is reduced or suspended in consideration of system power. For one embodiment of the present invention, a client processing system indicates its power mode to the JAVA applets of a web page. Action items within the web page respond to DC powered systems by limiting speed and/or the duration of animation for animated objects within the web page. Additionally, or alternatively, the limitation or suspension of animation may be in response to power level. For an alternative embodiment of the invention, the Java applet of a web page inquires of the OS of a processing system as to whether the processing system is a mobile processing system. A mobile system is assumed to be in a low power mode (e.g., DC powered) and the web page animation is limited or suspended accordingly. For one embodiment of the present invention the superfluous media content is reduced or suspended after some period regardless of system power considerations.

Incorporation of such features in web page authoring software such as FrontPage available from Microsoft Corporation of Redmond, Wash., or Macromedia Flash available from Macromedia Incorporated of San Francisco, Calif., will result in more mobile-friendly web pages. This will be particularly important when wireless web browsing is more commonplace, and the user is browsing with no external power source. Parking your system on a web page enabled in this way could increase battery-life, when the user is engaged in a passive task for a substantial period of time.

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Figure 1:
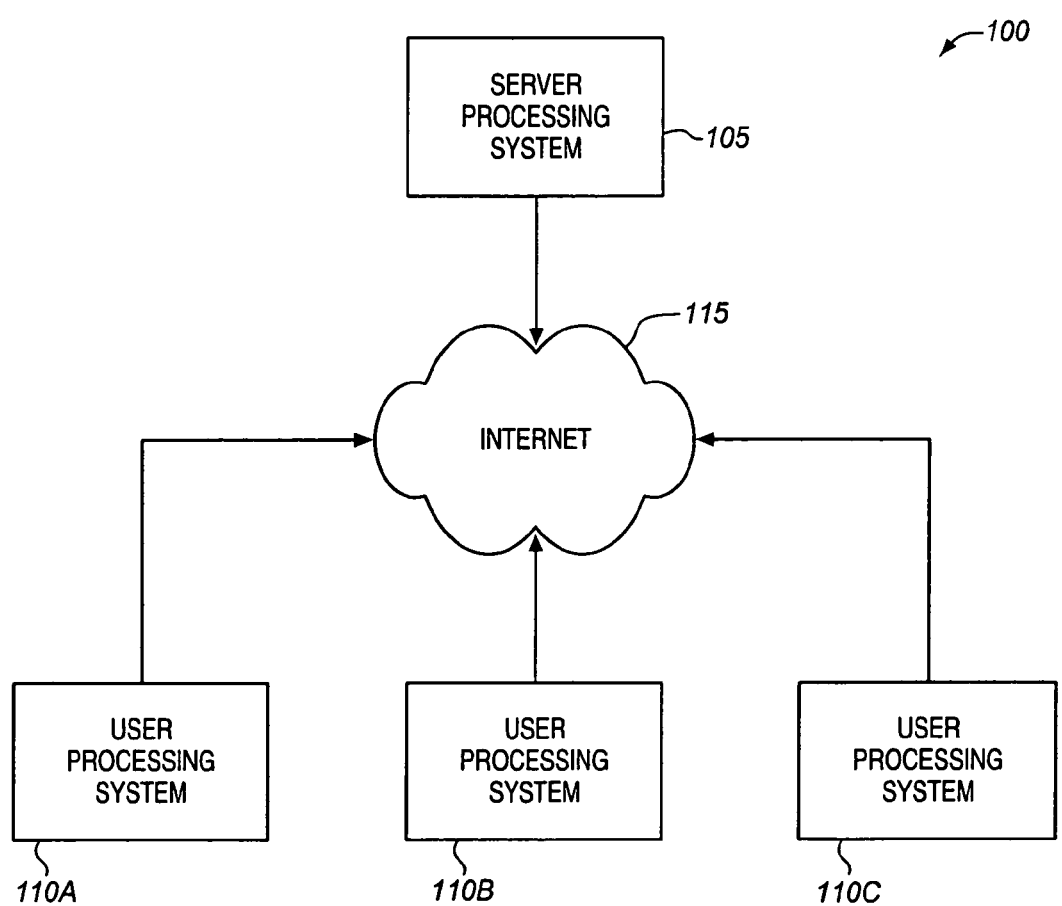
FIG. 1 is block diagram of a network of processing systems in which media content may be presented in accordance with one embodiment of the present invention.

FIG. 1 is block diagram of a network of processing systems in which media content may be presented in accordance with one embodiment of the present invention. As shown in FIG. 1, plurality of user processing systems 110A, 110B, and 110C are coupled to a server processing system 105 through Internet 115. The Internet 115 is a network of networks through which information is exchanged by methods well known to those in the art (e.g., the use of TCP and IP protocols, etc.). The server processing system 105 transmits a web page containing media content to one or more user processing systems 110A–110C. Embedded with the web page is a power mode/level determination applet (e.g., JAVA applet), which inquires of the user processing system's OS, the current power mode/level. For example the user processing system OS and chipset may be designed to implement the Advanced Configuration and Power Interface (ACPI) that allows the OS to provide the power mode/level information. The power mode/level determination applet passes on the current power mode/level to the software within the web page that is responsible for the media content requiring system activity. The software is configured to consider the power mode/level and reduce or suspend the presentation of such content. For example, the software may provide the functionality for an animated object that rotates 60 times per minute. If the user processing system is determined to be in DC mode, the software provides for the rotation to decrease over time and eventually cease. Thus allowing an otherwise inactive processing system to enter a low power mode.

For one embodiment of the invention, the animated object does not "spin down" gradually but ceases immediately under certain circumstances. If, for example, the JAVA applet determines that the power level is low, the software may provide that the rotation is suspended immediately.

Figure 2:
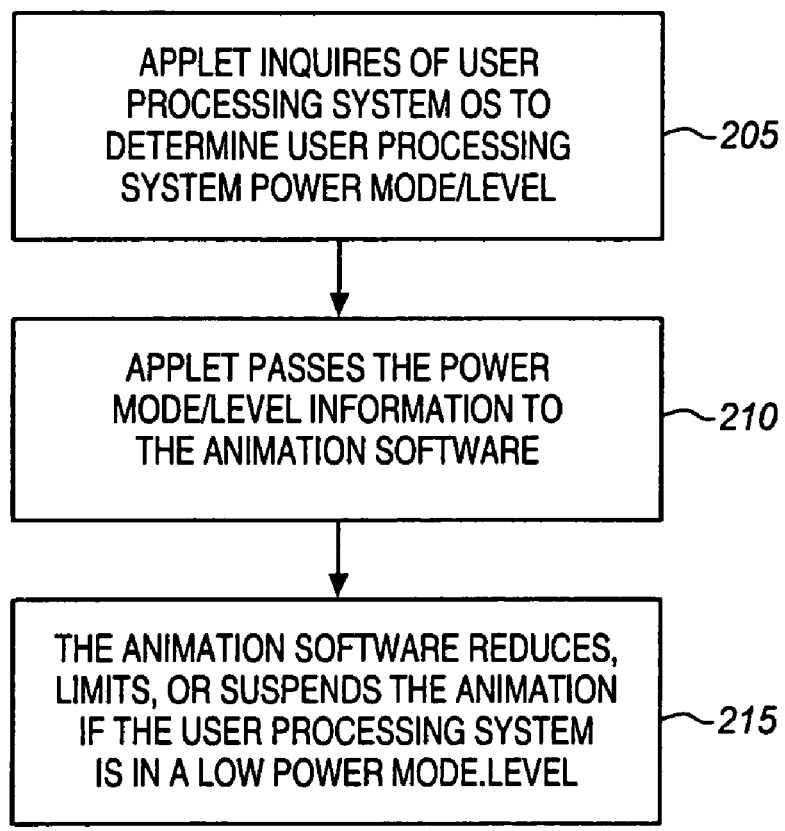
FIG. 2 is a process flow diagram in accordance with one embodiment of the present invention.

FIG. 2 is a process flow diagram in accordance with one embodiment of the present invention. The process 200, shown in FIG. 2, begins with operation 205 in which web pages having embedded therein a power mode/level determination applets is received at the user processing system. The applet inquires of the user processing system OS, the power mode/level. For one embodiment of the present invention, this inquiry is made immediately, alternatively the inquiry may be made after a predetermined time (e.g., one minute). For example, when the user accesses a web page, animated objects may move at full speed for the first minute. This allows for the effect of the animation (example advertising, entertainment, etc.). If the user maintains the presentation of the web page for a specified time, the inquiry into the power mode/level takes place. Alternatively, the inquiry to determine the power mode/level of the user processing system may take place periodically while the animated objects continue to move; once the animated objects have stopped moving, the applet may cease inquiry.

For alternative embodiments of the invention, the inquiry may be simply whether the user processing system is a mobile processing system or not. If the user processing system is a mobile processing system, the applet assumes it is operating in DC power mode.

At operation 210 the applet passes the information regarding the power mode/level to the software that provides the animation. If the system is operating in high performance mode (e.g., AC power mode) the animation software may ignore the power mode/level determination form the applet and present the fully animated object throughout the presentation of the Web page. If the system is operating in a low power consumption mode (e.g., DC power mode) the animation software may modify the presentation of the animated object.

For alternative embodiments of the invention, the animation software may effect a modification of animated objects based on criteria other than the power mode/level of the user processing system. For example, the animation or other superfluous media content may cease to be presented after a specified interval or due to user action.

At operation 215 the animation software causes the animation to be reduced or suspended if the user processing system is operating in DC power mode. For example, for a spinning object, the rate of rotation may decrease over some set time interval and then cease. Thus allowing an otherwise inactive processing system to enter a low power mode.

For one embodiment of the invention, if the power level is determined to be low, the animation may cease upon such determination or may "spin down" more quickly. For alternative embodiments of the invention, the animation software may suspend animation for a specified period and then resume and suspend periodically.

For alternative embodiments of the invention, the superfluous media content may be other than animated objects. For example, background music may be reduced or suspended in accordance with one embodiment of the present invention.

Figure 3:
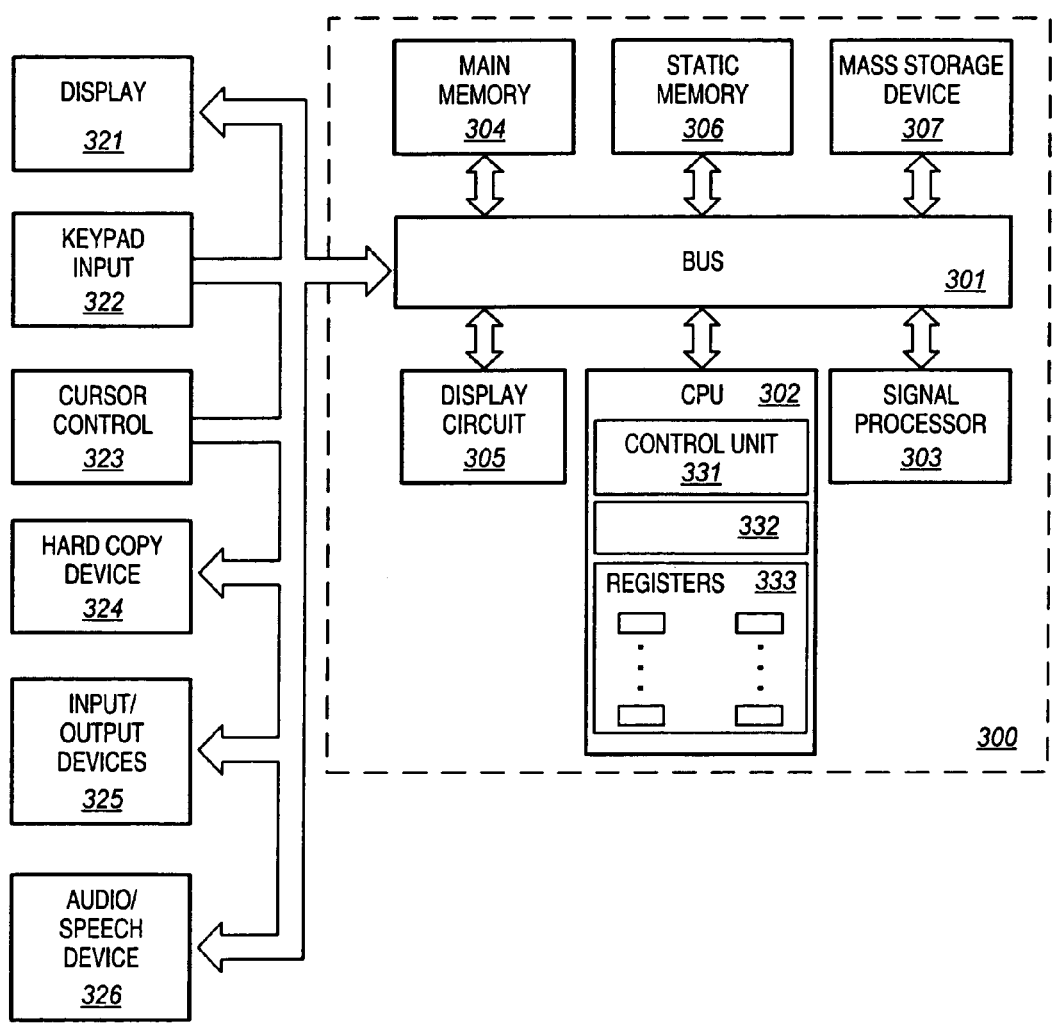
FIG. 3 is a diagram illustrating an exemplary processing system 300 for implementing an embodiment of the present invention.

FIG. 3 is a diagram illustrating an exemplary processing system 300 for implementing an embodiment of the present invention. The limitation and/or suspension of the presentation of superfluous media content as described herein may be implemented and utilized within processing system 300, which may represent a general-purpose computer, portable or mobile computer, or other like device. The components of processing system 300 are exemplary in which one or more components may be omitted or added. For example, one or more memory devices may be utilized for processing system 300.

Referring to FIG. 3, processing system 300 includes a central processing unit 302 and a signal processor 303 coupled to a display circuit 305, main memory 304, static memory 306, and mass storage device 307 via bus 301. Processing system 300 may also be coupled to a display 321, keypad input 322, cursor control 323, hard copy device 324, input/output (I/O) devices 325, and audio/speech device 326 via bus 301.

Bus 301 is a standard system bus for communicating information and signals. CPU 302 and signal processor 303 are processing units for processing system 300. CPU 302 or signal processor 303 or both may be used to process information and/or signals for processing system 300. CPU 302 includes a control unit 331, an arithmetic logic unit (ALU) 332, and several registers 333, which are used to process information and signals. Signal processor 303 may also include similar components as CPU 302.

Main memory 304 may be, e.g., a random access memory (RAM) or some other dynamic storage device, for storing information or instructions (program code), which are used by CPU 302 or signal processor 303. Main memory 304 may store temporary variables or other intermediate information during execution of instructions by CPU 302 or signal processor 303. Static memory 306, may be, e.g., a read only memory (ROM) and/or other static storage devices, for storing information or instructions, which may also be used by CPU 302 or signal processor 303. Mass storage device 307 may be, e.g., a hard or floppy disk drive or optical disk drive, for storing information or instructions for processing system 300.

Display 321 may be, e.g., a cathode ray tube (CRT) or liquid crystal display (LCD). Display device 321 displays information or graphics to a user. Processing system 300 may interface with display 321 via display circuit 305. Keypad input 322 is an alphanumeric input device with an analog to digital converter. Cursor control 323 may be, e.g., a mouse, a trackball, or cursor direction keys, for controlling movement of an object on display 321. Hard copy device 324 may be, e.g., a laser printer, for printing information on paper, film, or some other like medium. A number of input/output devices 325 may be coupled to processing system 300. The process of determining the power mode/level of a user processing system and reducing, limiting, or suspending the presentation of media content based upon that determination in accordance with one embodiment of the present invention may be implemented by hardware and/or software contained within processing system 300. For example, CPU 302 or signal processor 303 may execute code or instructions stored in a machine-readable medium, e.g., main memory 304.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

In the foregoing specification, the specific exemplary embodiments of the invention have been described. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    accessing media content at a processing system, the media content containing a power mode applet;
    running the applet at the processing system to determine a power mode of the processing system;
    presenting the media content on the processing system, the media content including superfluous content, the superfluous content requiring system activity; and
    modifying the presentation of the superfluous media content in response to the determined power mode.

2. The method of claim 1, wherein the media content is a web page.

3. The method of claim 2, wherein the processing system is a mobile computing system.

4. The method of claim 3, wherein the power mode is tat the mobile computing system is operating in a low power mode.

5. The method of claim 3, wherein the superfluous content is an animated object.

6. The method of claim 5, wherein modifying the presentation of the animated object includes reducing a rate of movement of the animated object over a time interval until the object is no longer animated.

7. The method of claim 3, wherein the power mode is that the mobile computing system is operating at a low power level.

8. The method of claim 7, wherein the superfluous content is en animated object and modifying the presentation of the animated object includes suspending the animation upon determining is that the mobile computing system is operating at a low power level.

9. The method of claim 1, wherein the superfluous content is audio content.

10. A method comprising:
    accessing media content via a mobile processing system, the media content containing an animated object and a power mode applet;
    running the applet at the mobile processing system to determine a power mode of the mobile processing system; and
    suspending animation of the animated object if the determined power mode of the mobile processing system is a low power mode.

11. The method of claim 10, wherein the media content is a web page.

12. The method of claim 11, wherein suspending animation of the animated object includes reducing a rate of movement of the animated object over a time interval until the object is no longer animated.

13. The method of claim 11, wherein determining the power mode of the mobile processing system further includes determining the power level of the mobile processing system.

14. A machine-readable medium that provides executable instructions, which when executed by a processor, cause the processor to perform a method comprising:
    accessing media content at a presentation device, the media content containing a power mode applet;
    running the applet at the presentation device to determine a power mode of the presentation device;
    presenting the media content on the presentation device, the media content including superfluous content, the superfluous content requiring system activity; and
    modifying the presentation of the superfluous media content in response to the determined vower mode.

15. The machine-readable medium of claim 14, wherein the media content is a web page.

16. The machine-readable medium of claim 15, wherein the presentation device is a mobile computing system.

17. The machine-readable medium of claim 16, wherein the power mode is that the mobile computing system is operating in a low power mode.

18. The machine-readable medium of claim 16, wherein the superfluous content is an animated object.

19. The machine-readable medium of claim 18, wherein modifying the presentation of the animated object includes reducing a rate of movement of the animated object over a time interval until the object is no longer animated.

20. The machine-readable medium of claim 16, wherein the power mode is that the mobile computing system is operating at a low power level.

21. The machine-readable medium of claim 20, wherein the superfluous content is an animated object and modifying the presentation of the animated object includes suspending the animation upon determining is that the mobile computing system is operating at a low power level.

22. The machine-readable medium of claim 14, wherein the superfluous content is audio content.

23. A machine-readable medium tat provides executable instructions, which when executed by a processor, cause the processor to perform method comprising:
    accessing media content via a mobile processing system, the media content containing an animated object and a power mode applet;
    running the applet at the mobile processing system to determine a power mode of the mobile processing system; and
    suspending animation of the animated object if the determined power mode of the mobile processing system is a low power mode.

24. The machine-readable medium of claim 23, wherein suspending animation of the animated object includes reducing a rate of movement of the animated object over a time interval until the object is no longer animated.

25. The machine-readable medium of claim 23, wherein determining the power mode of the mobile processing system further includes determining the power level of the mobile processing system.

26. An apparatus comprising a processor wit a memory coupled thereto, the memory having stored therein instructions which, when executed by the processor, cause the processor to;
    access media content at a presentation device, the media content containing a power mode applet:
    run the applet at the presentation device to determine a power mode of the presentation device;
    present the media content via the presentation device, the media content containing an animated object; and
    modify animation of the animated object based on the determined power mode.

27. The apparatus of claim 26, wherein the presentation device is determined to be operating in a low power mode if the presentation device is operating on direct current.

28. A system comprising:

a server processing system;

a user processing system coupled to the server processing system via an internet, the server processing system providing data to the user processing system, the data containing executable instructions which, when executed by the user processing system, cause the user processing system to;

access media content from the server processing system, the media content containing a power mode applet;

run the applet at the user processing system to determine a power mode of the user processing system; present the media content via a presentation device of the user processing system, the media content containing an animated object; and modify animation of the animated object based on the determined power mode.

29. The system of claim 28, wherein the user processing system is a mobile processing system.

30. The system of claim 29, wherein the server processing system is coupled to the mobile processing system via a wireless network connection.

\* \* \* \* \*

UNITED STATES PATENT AND TRADEMARK OFFICE
CERTIFICATE OF CORRECTION

| | |
|---|---|
| PATENT NO. | : 7,000,126 B2 |
| APPLICATION NO. | : 10/126274 |
| DATED | : February 14, 2006 |
| INVENTOR(S) | : Stanley |

It is certified that error appears in the above-identified patent and that said Letters Patent is hereby corrected as shown below:

In column 5, at line 28, delete "tat" and insert --that--.
In column 5, at line 41, delete "en" and insert --an--.
In column 5, at line 43, delete the first occurrence of "is".
In column 6, at line 12, delete "vower" and insert --power--.
In column 6, at line 36, delete "tat" and insert --that--.
In column 6, at line 56, delete "wit" and insert --with--.
In column 6, at line 59, delete ";" and insert --:--.
In column 7, at line 11, delete ";" and insert --:--.

Signed and Sealed this

Sixth Day of November, 2007

JON W. DUDAS
*Director of the United States Patent and Trademark Office*